Aug. 16, 1960 G. E. LEWIS 2,949,048
PLANETARY GEAR REDUCTION UNIT
Filed Aug. 26, 1957 2 Sheets-Sheet 1
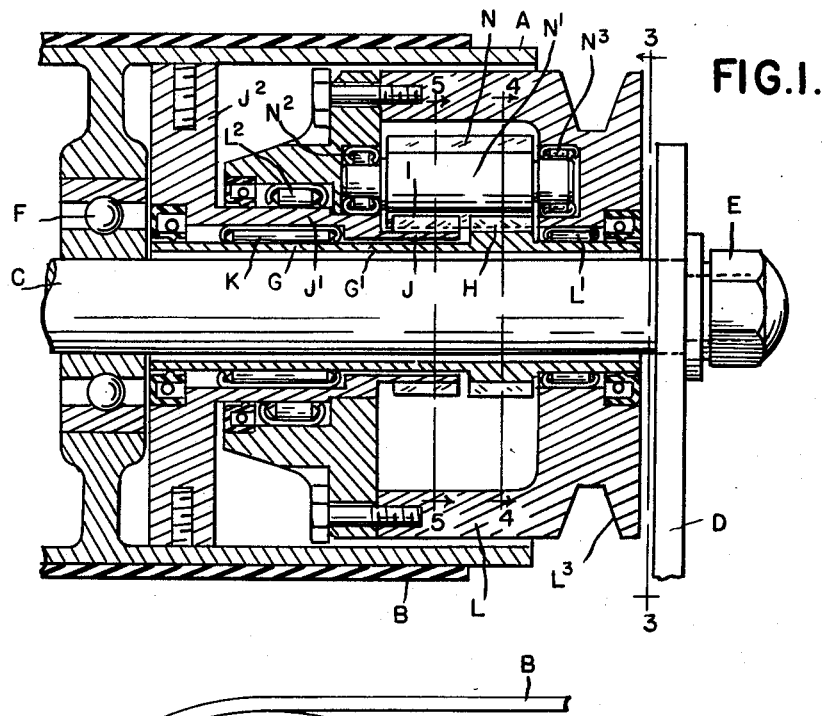
FIG.I.
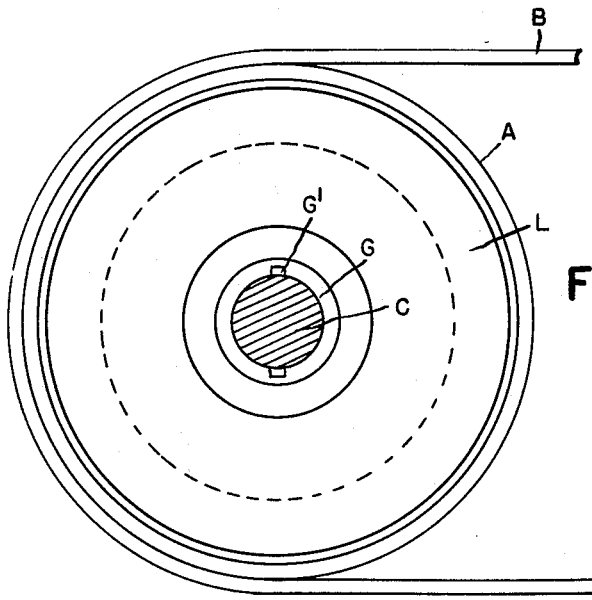
FIG.3.
*INVENTOR.*
GEORGE E. LEWIS
BY
ATTORNEYS Aug. 16, 1960 G. E. LEWIS 2,949,048
PLANETARY GEAR REDUCTION UNIT
Filed Aug. 26, 1957 2 Sheets-Sheet 2
FIG.2.
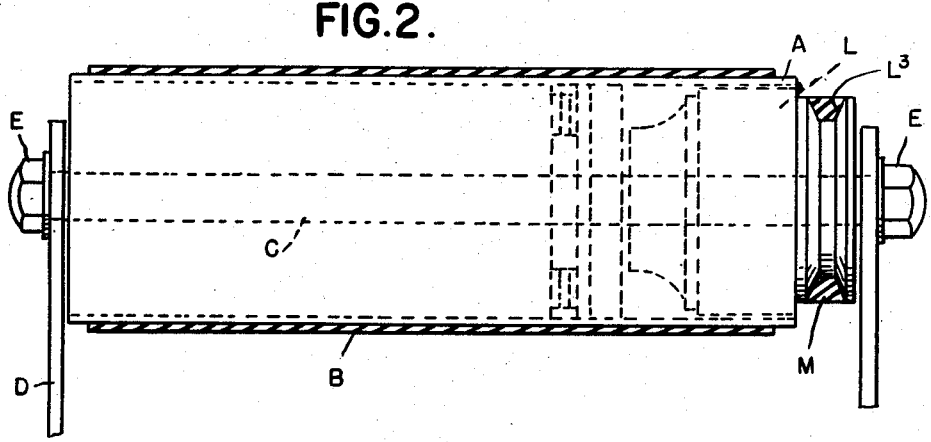
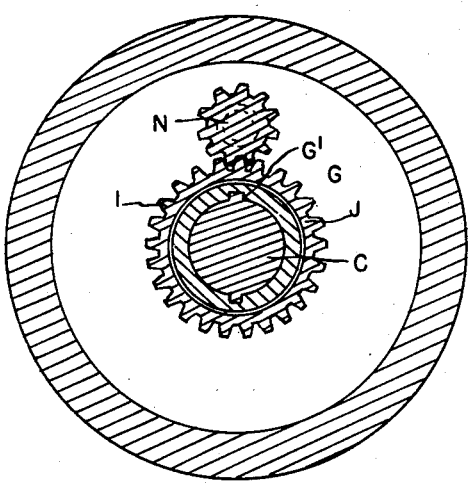
FIG.5.
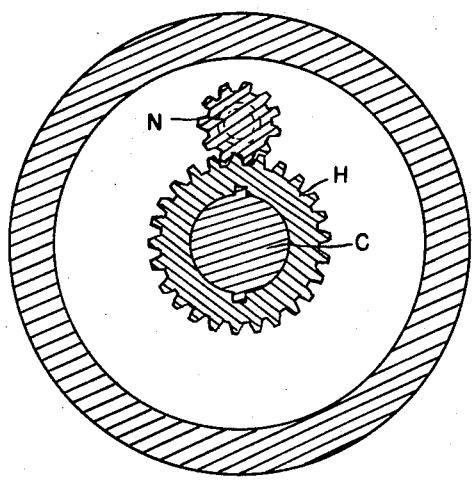
FIG.4.
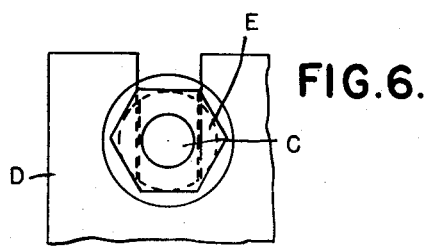
FIG.6.
INVENTOR.
GEORGE E. LEWIS
BY
Whittemore Hulbert & Belknap
ATTORNEYS

United States Patent Office 2,949,048
Patented Aug. 16, 1960

2,949,048

PLANETARY GEAR REDUCTION UNIT

George E. Lewis, 140 E. Wayne St., Dunkirk, Ohio

Filed Aug. 26, 1957, Ser. No. 680,268

2 Claims. (Cl. 74—802)

The invention relates to planetary gear reduction units and more particularly to a construction adapted for incorporation in a pulley of a belt conveyor system to supply power thereto or draw off power therefrom. To this end the invention consists in the construction as hereinafter set forth.

In the accompanying drawings:

Fig. 1 is a longitudinal central section through the unit and a part of its driving pulley.

Fig. 2 is a plan view thereof.

Fig. 3 is a cross section on line 3—3 of Fig. 1.

Figs. 4 and 5 are cross sections respectively on lines 4—4 and 5—5 of Fig. 1.

Fig. 6 is an end elevation showing the manner of holding the pulley supporting shaft against rotation.

As shown in Figs. 1 and 2, A is a pulley for supporting a conveyor belt B, mounted on a stationary shaft C which in turn is mounted on a frame D and held thereon from rotation by suitable means, such as end clamping nuts E. The pulley is supported on the shaft by ball bearings F, one of which is spaced from one end of the pulley and within the same. The space out beyond this bearing is occupied by a planetary reduction unit constructed as follows:

G is a member sleeved upon the shaft C and keyed thereto at G'. H is a small gear wheel or pinion fixed to and preferably integral with the member G. I is an adjacent gear wheel or pinion integral with a member J which has a portion J' sleeved over the sleeve G and connected by a head portion J² with the pulley A adjacent to the bearing F. A roller bearing K is between the sleeves G and J'. L is a pulley within the outer end portion of the pulley A and supported by roller bearings L' and L² on the sleeves G and J'. This pulley projects slightly beyond the end of the pulley A and has a groove L³ therein for engaging a belt M of V-shaped cross section. Within and upon the pulley L is mounted a planetary pinion N which is of a length to intermesh with both the gear wheels H and I, and is supported on a rotary shaft N' which at its opposite ends engages roller bearings N² and N³ in the pulley L.

The construction as above described is used primarily to transmit additional torque to a pulley of a belt conveyor system but it is also capable of the reverse use of drawing off power from a conveyor. In either case the planetary gear in travelling around the fixed gear is rotated about its own axis and through its intermeshing relation with the other gear will transmit torque from one pulley to the other.

What I claim as my invention is:

1. A belt supporting pulley, a non-rotating shaft on which said pulley is journaled, a second pulley also journaled on said shaft, a planetary reduction gearing for driving one pulley from the other at a differential speed, planetary gearing securing means detachably mounted to one end of said shaft, said gearing being slidable from said shaft on removal of said securing means whereby said belt supporting pulley may be freely rotated by the belt supplied thereby.

2. A stationary shaft removably secured by means of a clamping member to supporting means, a bearing mounted conveyor belt supporting pulley rotatably supported on said stationary shaft, a first sun gear sleeved over said shaft and secured to said belt supporting pulley, a second sun gear mounted against rotation on said stationary shaft adjacent said first sun gear, a second pulley rotatably sleeved on said shaft, and a planet gear rotatably carried by said second pulley and in mesh with both of said sun gears whereby torque is transmitted between said pulleys on relative rotation thereof, said second pulley and planet gear being removable from said shaft on release of said clamping member and removal of said shaft from said supporting means, said belt supporting pulley being freely rotatable with said belt on removal of said second pulley and planet gear from said shaft.

References Cited in the file of this patent

UNITED STATES PATENTS

| | | |
|---|---|---|
| 123,618 | Damon | Feb. 13, 1872 |
| 402,601 | Lavery | May 7, 1889 |
| 552,183 | Johnson | Dec. 31, 1895 |
| 577,065 | Pole | Feb. 16, 1897 |
| 826,449 | Steere | July 17, 1906 |
| 1,777,490 | Hardie | Oct. 7, 1930 |
| 2,794,350 | Hart | June 4, 1957 |